United States Patent [19]
Natori

[11] Patent Number: 5,657,159
[45] Date of Patent: Aug. 12, 1997

[54] VIDEO DISPLAY APPARATUS

[75] Inventor: Takehisa Natori, Kanagawa, Japan

[73] Assignee: Sony Corporation, Tokyo, Japan

[21] Appl. No.: 590,942

[22] Filed: Jan. 24, 1996

[30] Foreign Application Priority Data

Jan. 27, 1995 [JP] Japan .................. 7-030257

[51] Int. Cl.$^6$ .................................. F21V 29/00
[52] U.S. Cl. .............. 359/448; 359/459; 362/1; 362/800; 362/806; 362/812
[58] Field of Search ................... 359/448, 449, 359/459; 362/800, 806–812

[56] References Cited

U.S. PATENT DOCUMENTS

| | | | |
|---|---|---|---|
| 4,630,180 | 12/1986 | Muraki et al. | 362/800 |
| 5,390,093 | 2/1995 | Himeno et al. | 362/800 |
| 5,400,228 | 3/1995 | Kao | 362/800 |
| 5,473,469 | 12/1995 | Magocs et al. | 359/449 |

*Primary Examiner*—Daniel P. Malloy
*Attorney, Agent, or Firm*—Jay H. Maioli

[57] ABSTRACT

A video display apparatus has a dot matrix of LEDs mounted on an LED matrix board, and a unitary reflecting member made of metal such as aluminum or the like mounted on the LED matrix board. The reflecting member has slanted reflecting surfaces disposed vertically one on each side of each of the LEDs for reflecting light emitted from the LEDs with narrow vertical directivity. The video display apparatus can provide a wide angle of view in the horizontal direction, and a narrow angle of view in the vertical direction for preventing light from being scattered in the vertical direction to maintain a desired level of luminosity.

7 Claims, 10 Drawing Sheets

F I G. 10A
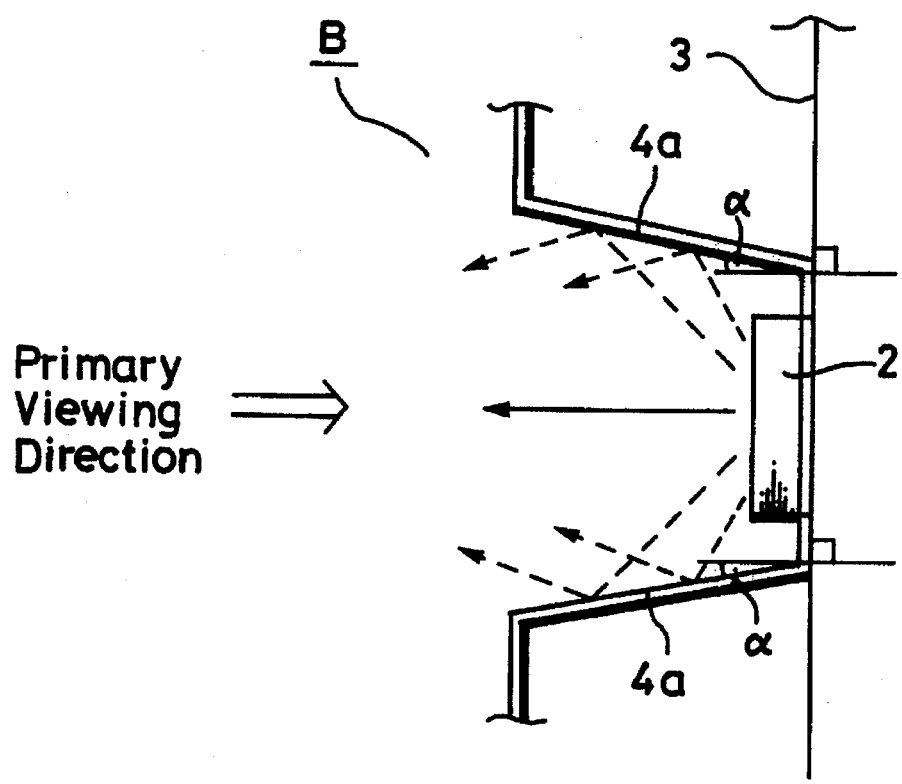
F I G. 10B
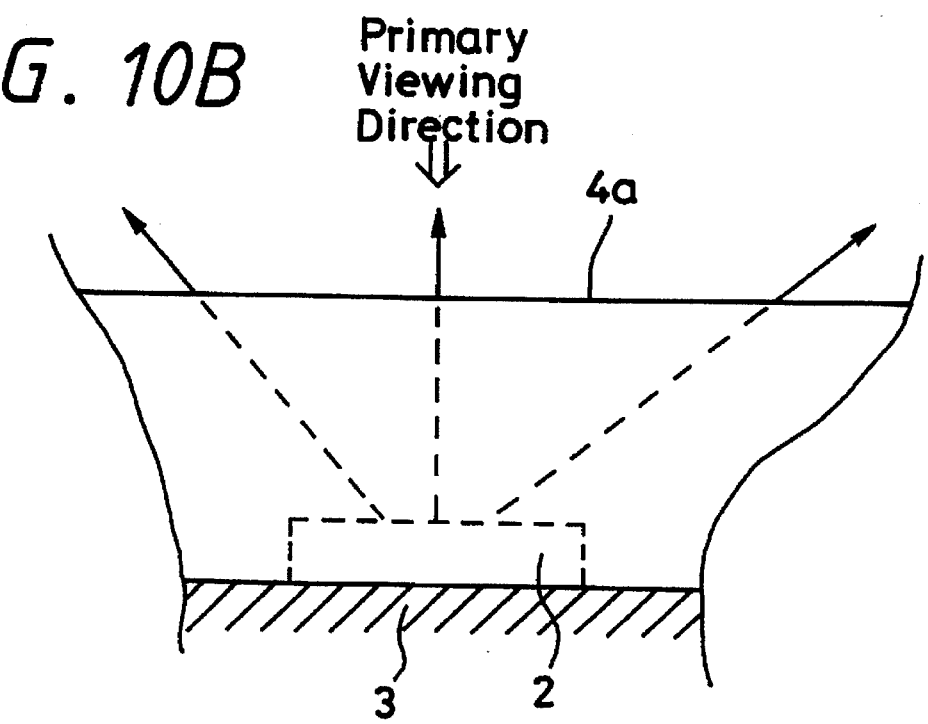

VIDEO DISPLAY APPARATUS

BACKGROUND OF THE INVENTION

The present invention relates to a video display apparatus composed of light-emitting elements such as light-emitting diodes or the like.

There have been developed video display apparatus composed of light-emitting elements such as light-emitting diodes (LED) or the like for displaying images.

FIG. 1 of the accompanying drawings shows a display panel of an LED video display apparatus. As shown in FIG. 1, the display panel of the LED video display apparatus, generally designated by the reference numeral 1, has a dot matrix of LEDs 2 disposed respectively at positions each indicated by a circle and mounted on an LED matrix board 3.

In the illustrated LED video display apparatus 1, the display panel is composed of 16 vertical arrays×16 horizontal arrays=256 LEDs. Actually, however, a number of such display panels are combined into a large-size display panel for displaying large images. For full-color image display, pixels each composed of blue, red, and green LEDs are arranged in a matrix on X- and Y-axes.

FIG. 2 of the accompanying drawings illustrates a known structure for each of the LEDs 2 in the LED video display apparatus 1. As shown in FIG. 2, the LED 2 comprises a pellet 2b encased in a molded resin cover 2a in the shape of a lens which is symmetric with respect to an optical axis thereof. The resin cover 2a may be molded of an epoxy resin, for example.

The pellet 2b, which is a light-emitting body, comprises a semiconductor PN junction, and emits light in a color determined by the material and shape of the semiconductor of the PN junction. The pellet 2b is disposed in a reflector R formed on an electrode lead 2d, and connected to another electrode lead 2d by a bonding wire 2c.

Light emitted substantially horizontally from the pellet 2b is reflected forwardly by the reflector R disposed around the pellet 2b, and is discharged from the LED 2 with relatively narrow directivity by the action of the axis-symmetric lens of the resin cover 2a.

Since the light discharged from each of the LEDs 2 is refracted by the lens so as to converge substantially along the optical axis thereof, the LED video display apparatus 1 is highly luminous when it is viewed from its front side.

LED video display apparatus with large-size display panels are usually used in such conditions that their vertical angle of view is not required to be large, but at least the horizontal angle of view should preferably be as large as possible.

The LED video display apparatus 1 which is composed of the LEDs 2 shown in FIG. 2 can produce a high level of luminosity because the directivity of LEDs 2 is relatively narrow. However, the luminosity of the LED video display apparatus is lower, i.e., the angle of view thereof is smaller, when it is viewed from directions other than the front side thereof.

The process of manufacturing the LED video display apparatus 1 is complex because the LEDs 2 are attached to the LED matrix board 3 by inserting and soldering the electrode leads 2d of the LEDs 2 in lead holes which are defined in the LED matrix board 3.

FIG. 3 of the accompanying drawings shows a surface-mounted LED 2 different from the LED 2 shown in FIG. 2. Those parts of the surface-mounted LED 2 shown in FIG. 3 which are identical to those of the LED 2 shown in FIG. 2 are denoted by identical reference characters.

As shown in FIG. 3, the surface-mounted LED 2 comprises a pellet 2b mounted on an electrode 2d disposed on a base 2e and a block-shaped resin cover 2a molded around the pellet 2b, the pellet 2b being connected to another electrode 2d by a bonding wire 2c. The surface-mounted LED 2 has no reflector for reflecting light emitted from the pellet 2b in a forward direction, and the resin cover 2a is not in the shape of a lens for converging the emitted light. Therefore, the surface-mounted LED 2 emits in a diffused pattern, i.e., has relatively wide directivity. The base 2e carries a cathode mark KM on one end thereof, indicating that the electrode 2d near the cathode mark KM is a cathode electrode.

The surface-mounted LED 2 can be manufactured more easily than the LED 2 shown in FIG. 2 because the LED 2 may be placed in position on an LED matrix board and soldered thereby by reflow soldering. The relatively wide directivity of the surface-mounted LED 2 allows the video display apparatus incorporating the same to have wide angles of view in both vertical and horizontal directions. However, the relatively wide directivity of the surface-mounted LED 2 also poses a problem because the emitted light is diffused and the video display apparatus cannot produce a high level of luminosity.

SUMMARY OF THE INVENTION

It is therefore an object of the present invention to provide a video display apparatus composed of light-emitting elements such as LEDs which provides a relatively wide angle of view in at least a horizontal direction and produces a high level of luminosity.

According to the present invention, there is provided a video display apparatus comprising a matrix board, a dot matrix of light-emitting elements mounted on the matrix board for displaying an image, and a reflecting member mounted on the matrix board and having a plurality of pairs of reflecting surfaces inclined with respect to the matrix board, the reflecting surfaces of each pair being disposed vertically one on each side of each of the light-emitting elements.

The reflecting surfaces of each pair may extend continuously horizontally and are integrally joined to each other at lower ends thereof, and adjacent ones of the reflecting surfaces of adjacent ones of the pairs may be integrally joined to each other at upper ends thereof. The reflecting member may have a plurality of openings defined therein between the reflecting surfaces which are integrally joined to each other at the lower ends thereof, the light-emitting elements being exposed through the openings. The reflecting surfaces may be integrally joined at the upper and lower ends thereof by black or roughened surface regions.

The reflecting surfaces may be made of a material of high thermal conductivity. The light-emitting elements may comprise light-emitting elements for emitting lights in different colors and are arranged successively horizontally. The light-emitting elements may comprise light-emitting diodes.

The reflecting surfaces, which are inclined with respect to the matrix board and disposed vertically one on each side of each of the light-emitting elements, reflect vertically scattered rays of light emitted from the light-emitting elements to travel forwardly in the primary viewing direction. Therefore, if the light-emitting elements comprise surface-mounted LEDs which can emit light with wide directivity, then the video display apparatus provides a horizontally wide angle of view while maintaining a desired high level of luminosity. Since the reflecting member is of a unitary structure including the integrally joined reflecting surfaces, the number of components of the video display apparatus is relatively small, and the video display apparatus can be assembled with ease.

If the regions of the reflecting member other than the reflecting surfaces have black or roughened surfaces, then they are effective in minimizing unwanted reflections for increased image contrast.

If the reflecting member is made of a material of good thermal conductivity such as aluminum, then it can dissipate the heat which is generated by the light-emitting elements.

If the light-emitting elements comprise light-emitting elements for emitting lights in different colors to display color images, then they are arranged successively in the horizontal direction in which the emitted lights are scattered. This successive arrangement of the light-emitting elements is effective in reducing changes of luminosity ratios of the produced colors depending on the vertical position from which the video display apparatus is viewed.

BRIEF DESCRIPTION OF THE DRAWINGS

FIG. 10A is an enlarged fragmentary side elevational view showing the manner in which light emitted from an LED is reflected by the reflecting member;

FIG. 10B is an enlarged fragmentary front elevational view showing the manner in which light emitted from an LED is reflected by the reflecting member.

DETAILED DESCRIPTION OF THE PREFERRED EMBODIMENT

A video display apparatus according to the present invention comprises a matrix of surface-mounted LEDs having wide directivity which are capable of emitting light in colors R (red), G (green), B (blue) for displaying full-color images.

Figure 5:
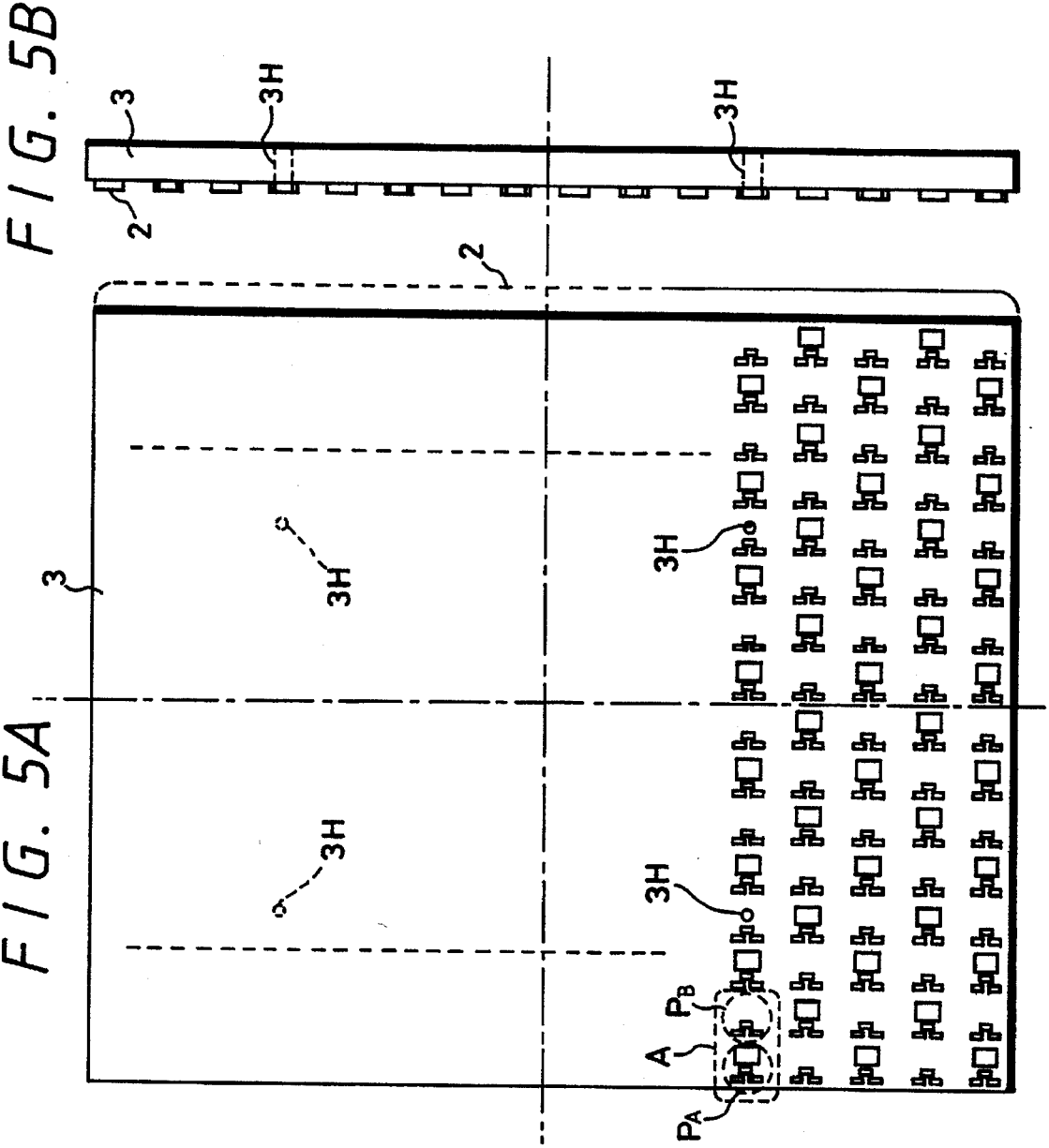
FIG. 5A is a front elevational view showing a matrix of LEDs on an LED matrix board of the video display apparatus shown in FIGS. 4A and 4B.
FIG. 5B is a side elevational view showing the matrix of LEDs on the LED matrix board.

As shown in FIGS. 5A and 5B, a plurality of surface-mounted LEDs 2 are mounted on an LED matrix board 3. The LED matrix board 3 has four screw holes 3H (described later on) defined therein.

Some of the surface-mounted LEDs 2 are omitted from illustration in FIG. 5A. Actually, however, the surface-mounted LEDs 2 are arranged in a pattern (described later on) over the entire surface of the LED matrix board 3. While the LED matrix board 3 is shown as having a vertically elongate rectangular shape in FIG. 5A, the LED matrix board 3 is not limited to such a shape, but may be of a square or horizontally elongate rectangular shape.

Figure 6:
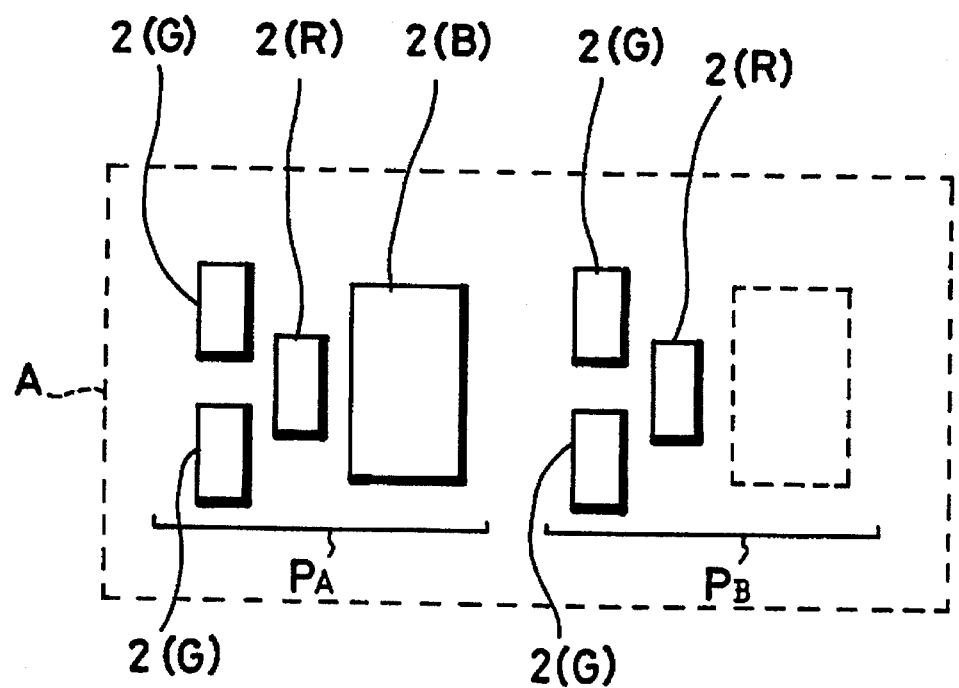
FIG. 6 is an enlarged view of a matrix of LEDs in pixels.

An LED-mounted region A indicated by the broken line in FIG. 5A contains surface-mounted LEDs 2 for emitting light in colors R, G, B which are arranged as shown in FIG. 6.

Specifically, as shown in FIG. 6, two green LEDs 2(G) for emitting green light are positioned in vertically spaced relationship in a left position, one red LED 2(R) for emitting red light is positioned adjacent to the green LEDs 2(G), and one blue LED 2(B) for emitting blue light is positioned adjacent to the red LED 2(R). The green LEDs 2(G), the red LED 2(R), and the blue LED 2(B) jointly make up a pixel $P_A$ for producing a color representation.

A pixel $P_B$ positioned adjacent to the pixel $P_A$ is made up of two green LEDs 2(G) and one red LED 2(R), and may further contain a blue LED 2(B) which may be dispensed with for the reasons described later on.

As shown in FIGS. 5A and 5B, the LEDs 2 are arranged in a checkerboard pattern in which the pixels $P_A$, $P_B$ are alternately arranged in the directions of rows and columns. In FIGS. 5A and 5B, 16 vertical arrays×16 horizontal arrays=256 pixels $P_A$, $P_B$ are arranged in a matrix on the LED matrix board 3.

A plurality of such LED matrix boards 3 may be combined in a pattern depending on a desired image display size, for example, thereby producing a color image display system having a large-size display panel.

As can be seen from FIG. 5A, the pixels $P_B$ which are free of blue LEDs occupy half of the entire pixels of the video display apparatus. The reasons for this are as follows:

It is known that photoreceptors for sensing three primaries of red, green, and blue are located on the retina of the eye, and the photoreceptors for sensing blue have the lowest visual sensitivity, those for sensing red have better visual sensitivity, and those for sensing green have the highest visual sensitivity. Therefore, the matrix of pixels which contain pixels free of at least blue LEDs based on the above visual sensitivity characteristics does not adversely affect the color reproduction of full-color images on the video display apparatus.

Consequently, the matrix of pixels $P_A$, $P_B$ where the pixels $P_B$ are free of blue LEDs 2(B) is capable of displaying full-color images without adversely affecting the color reproducing capability of the video display apparatus. This allows the number of expensive blue LEDs to be reduced, lowering the cost of the video display apparatus.

While the ratio of the number of pixels $P_B$ to the entire number of pixels $P_A$, $P_B$ is about 50% in the illustrated embodiment, it may be modified without adversely affecting the visual color reproducing capability of the video display apparatus. Furthermore, the pattern of the pixels $P_B$ is not limited to the illustrated checkerboard pattern, but may be modified without adversely affecting the visual color reproducing capability of the video display apparatus.

Figure 1:
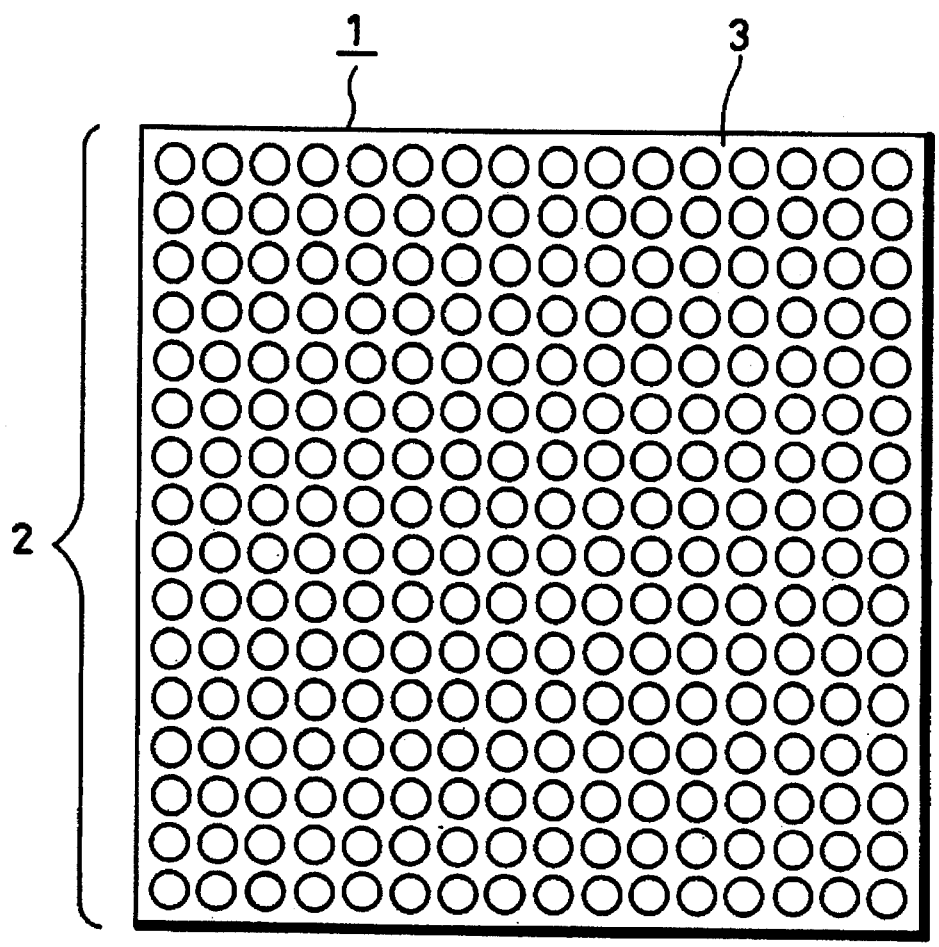
FIG. 1 is a plan view of a display panel of an LED video display apparatus.
Figure 2:
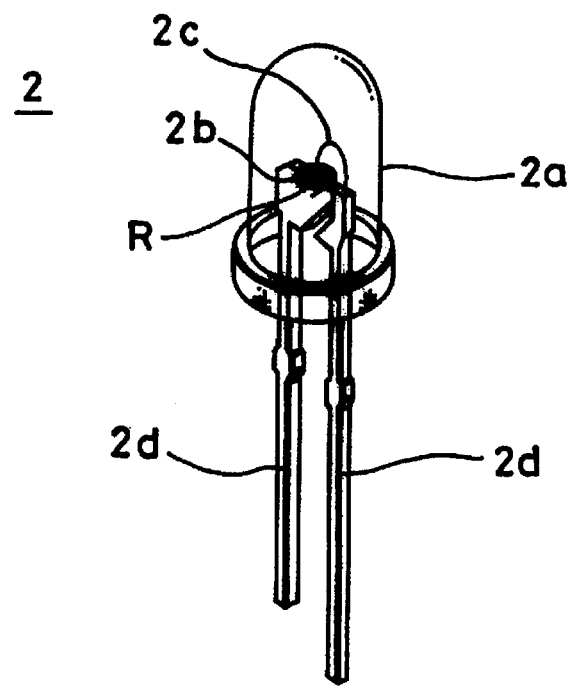
FIG. 2 is a perspective view of an LED of the display panel shown in FIG. 1, the LED having a resin cover in the shape of a lens which is symmetric with respect to an optical axis thereof.
Figure 3:
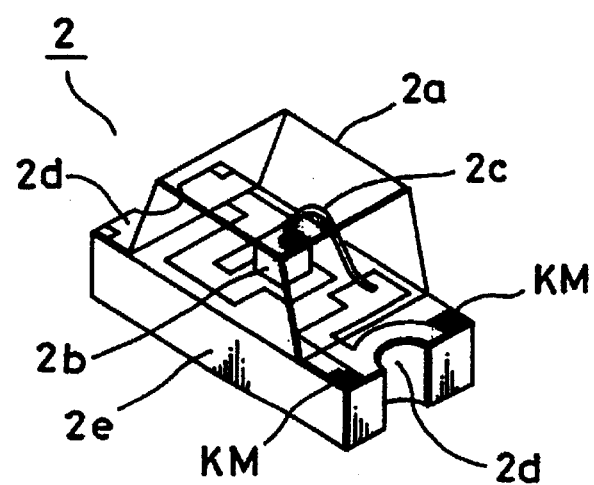
FIG. 3 is a perspective view of a surface-mounted LED.

The surface-mounted LEDs 2 of the video display apparatus according to the present invention may be installed on the LED matrix board 3 by soldering such as reflow soldering. Thus, the surface-mounted LEDs 2 can be attached to the LED matrix board 3 in a simpler process than the LEDs each having the resin cover 2a (see FIG. 2) in the shape of a lens which is symmetric with respect to an optical axis thereof.

The structure of, and a process of installing, a reflecting member in the video display apparatus according to the present invention will be described below with reference to FIGS. 7A, 7B, 8, and 9.

In FIGS. 7A, 7B, 8, and 9, only some of identical components are denoted by their reference characters, and those of the remainder omitted from illustration for the sake of brevity.

Figure 7:
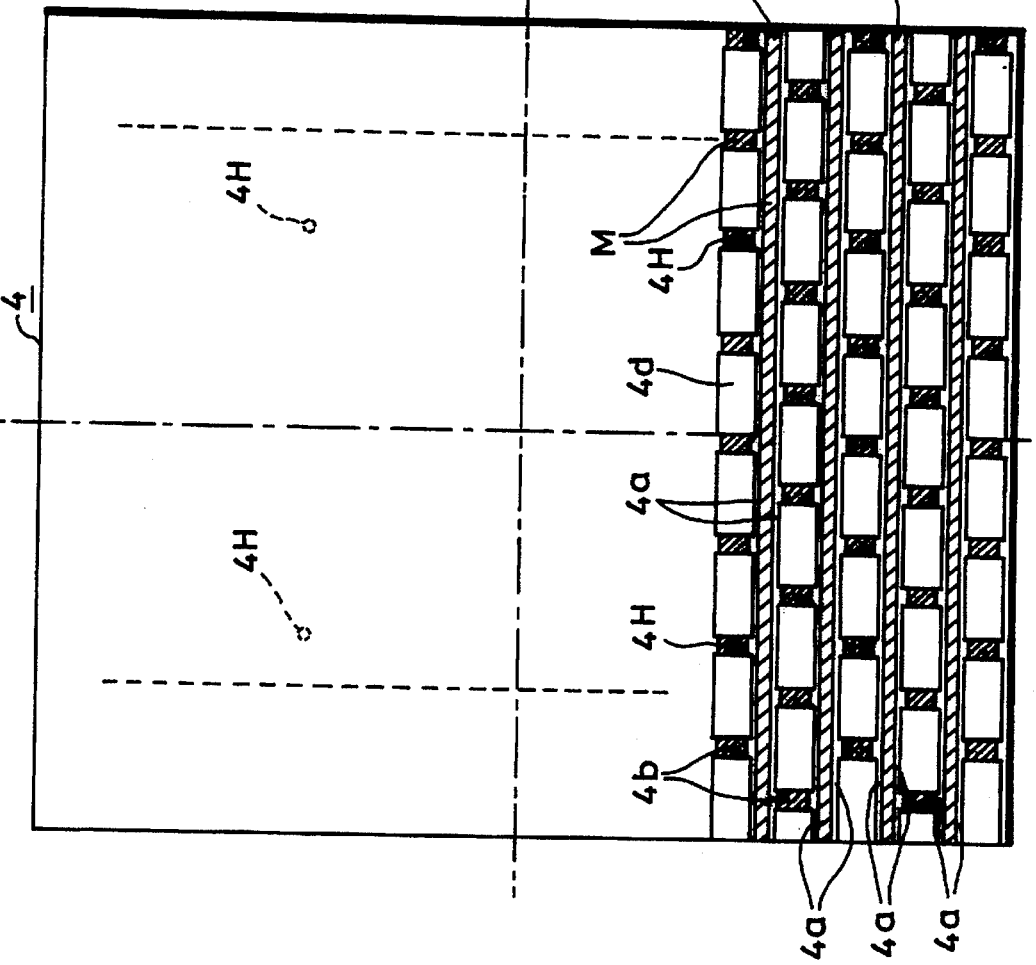
FIG. 7A is a front elevational view showing a reflecting member of the video display apparatus according to the present invention.
FIG. 7B is a side elevational view showing the reflecting member of the video display apparatus according to the present invention.
Figure 8:
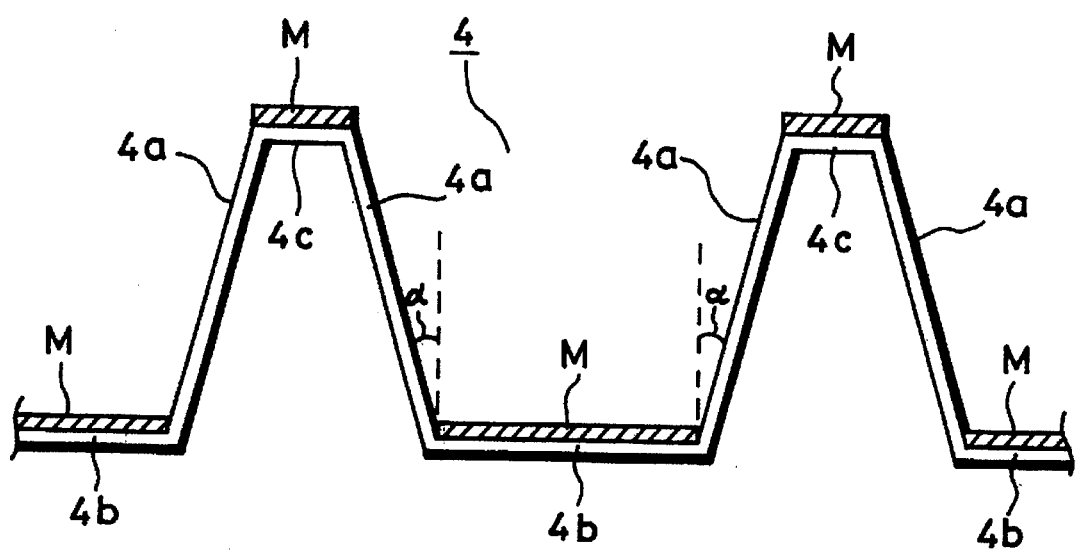
FIG. 8 is an enlarged fragmentary side elevational view of the reflecting member.
Figure 9:
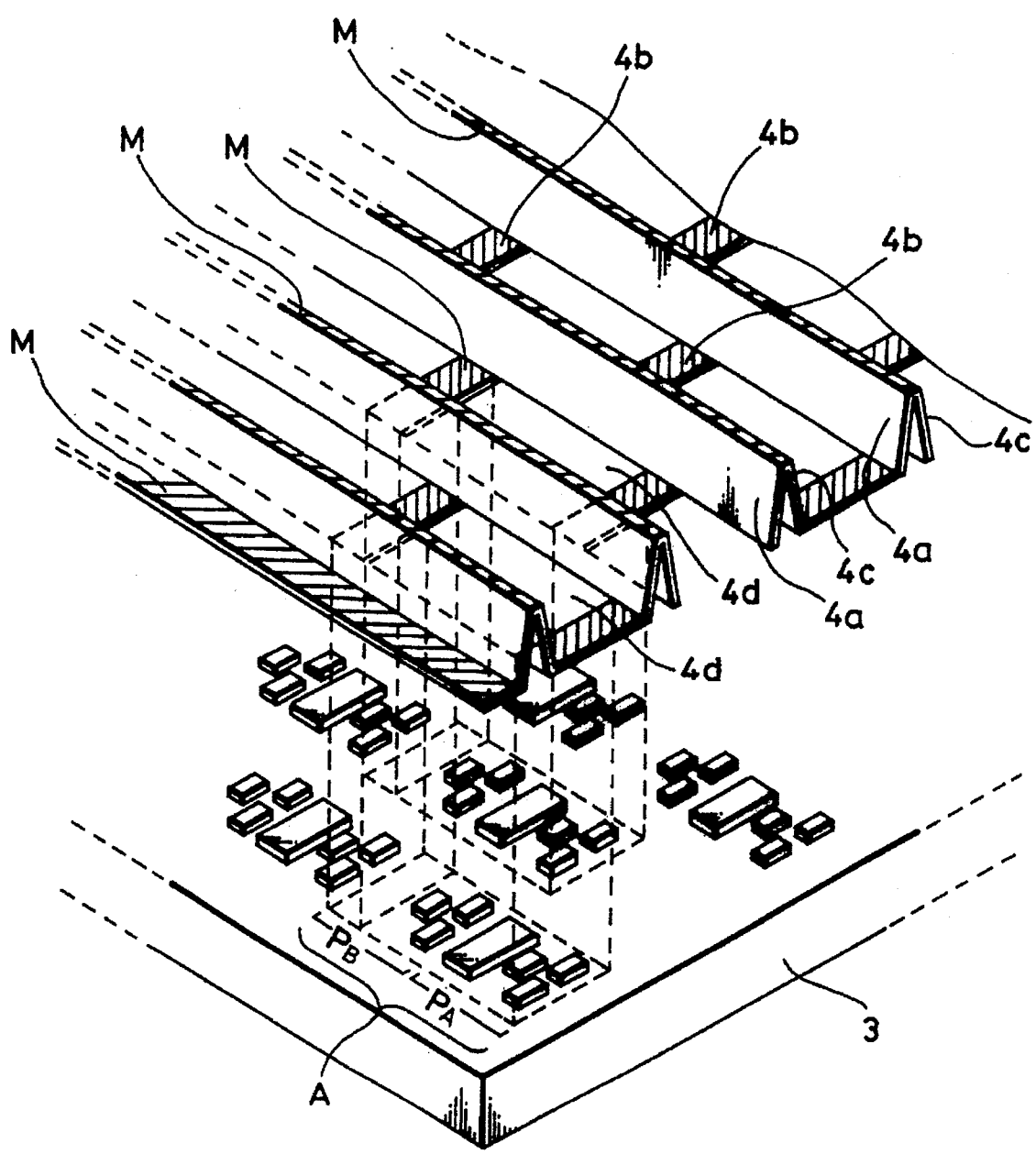
FIG. 9 is an enlarged fragmentary perspective view illustrating the manner in which the reflecting member is installed on the LED matrix board.

As shown in FIG. 7B, a reflecting member 4 comprises a metal sheet such as of aluminum bent into a succession of ridges each having a pair of opposite slanted surfaces 4a. As shown in FIG. 8, the slanted surfaces 4a are inclined at an angle α to a vertical direction normal to the general plane of the reflecting member 4. These slanted surfaces 4a are finished as a mirror surface and hence serve as reflecting surfaces 4a for reflecting light emitted from the LEDs 2. As shown in FIGS. 7A and 9, the reflecting surfaces 4a are continuous horizontally.

As shown in FIGS. 7A and 9, the reflecting member 4 has a plurality of openings 4d defined in a lower portion thereof each for exposing therethrough a unit assembly of LEDs 2 corresponding to the LED-mounted region A (see FIG. 5A) when the LEDs 2 are installed. Those reflecting surfaces 4a which are positioned vertically one on each side of each unit assembly of LEDs 2 are integrally joined to each other at lower ends thereof by lower surface regions 4b of the lower portion as shown in FIGS. 7A, 8, and 9. The reflecting member 4 has four screw holes 4H defined in respective four of the lower surface regions 4b. Those reflecting surfaces 4a which are positioned adjacent to each other without LEDs 2 interposed therebetween are integrally joined to each other at upper ends thereof by upper surface regions 4c as shown in FIGS. 7B, 8, and 9.

The lower surface regions 4b and the upper surface regions 4c, which are shown hatched in FIGS. 7A, 8, and 9, i.e., those surface regions other than the reflecting surfaces 4a of the reflecting member 4, have respective upper surfaces which comprise black surfaces M for not reflecting light. Instead, the lower surface regions 4b and the upper surface regions 4c may comprise roughened upper surfaces for scattering light reflected thereby.

The reflecting member 4 is of an integral unitary structure having substantially the same size as that of the LED matrix board 3 shown in FIG. 5A.

As shown in FIG. 9, the reflecting member 4 is installed on the front surface of the LED matrix board 3 by positioning unit assemblies of 7 LEDs (see FIG. 6) that make up two pixels $P_A$, $P_B$ in alignment with the respective openings 4d in the reflecting member 4. Since the reflecting member 4 is of an integral unitary structure matching the size of the LED matrix board 3, the reflecting member 4 can easily be mounted on the LED matrix board 3.

Figure 4:
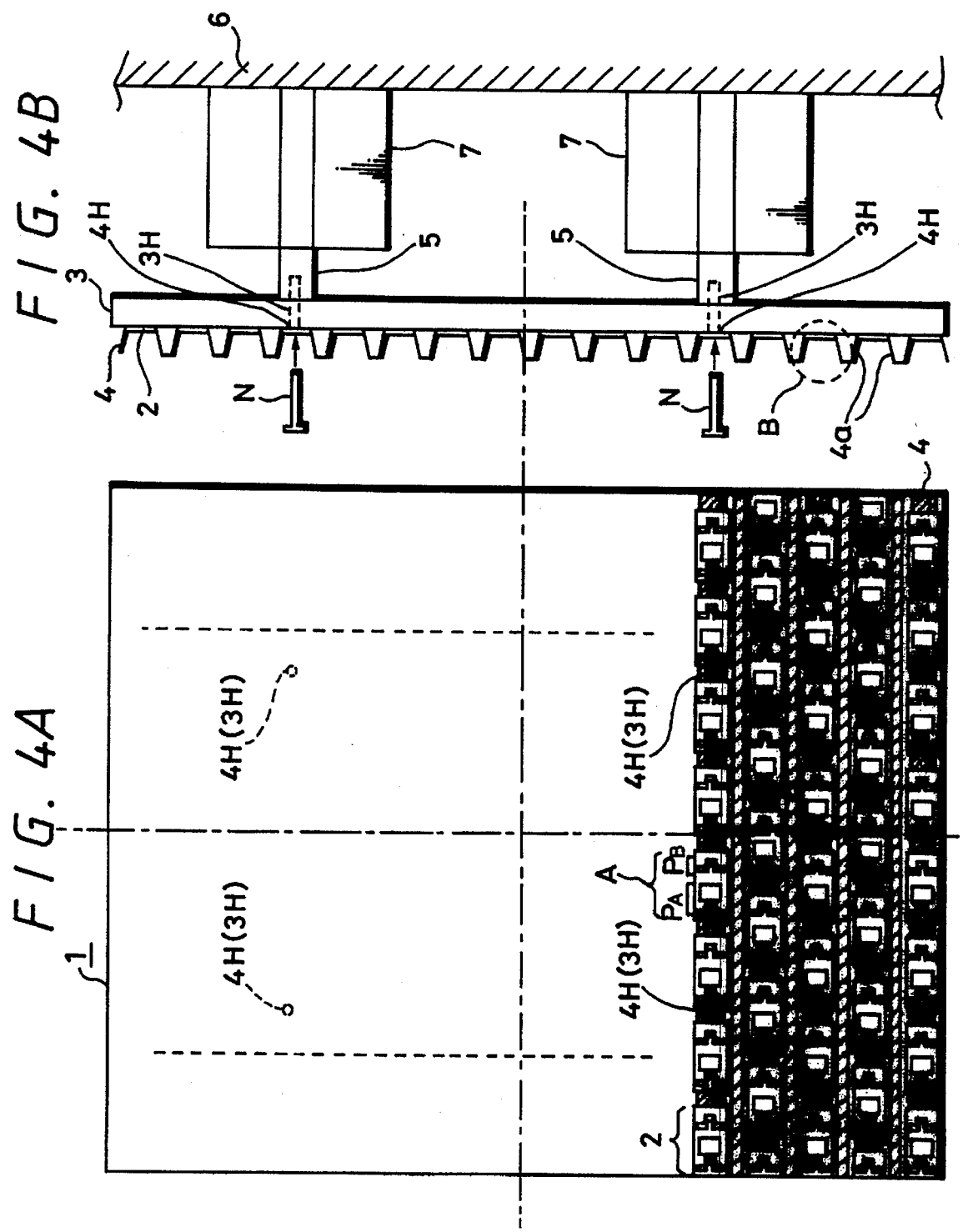
FIG. 4A is a front elevational view of a video display apparatus according to the present invention.
FIG. 4B is a side elevational view of the video display apparatus according to the present invention.

The reflecting member 4 and the LED matrix board 3 which are combined with each other are shown in FIGS. 4A and 4B. With the reflecting member 4 and the LED matrix board 3 being combined with each other, the LEDs 2 are snugly fitted in the respective openings 4d and exposed through the respective openings 4d. The lower surface regions 4b are positioned in spaces where no blue LEDs are provided in the pixels $P_B$.

As shown in FIG. 4A, the four screw holes 3H defined in the LED matrix board 3 are held in registry with the respective four screw holes 4H defined in the reflecting member 4. As shown in FIG. 4B, screws N are inserted from the front side of the reflecting member 4 through the registered screw holes 4H, 3H and threaded into distal ends of respective support studs 5 mounted on the back of the LED matrix board 3. Alternatively, the support studs 5 may have externally threaded distal ends which may be threaded into the back of the LED matrix board 3.

The support studs 5 have opposite ends fixed to a display apparatus body 6. Therefore, when the reflecting member 4 and the LED matrix board 3 are fastened to the support studs 5 by the screws N, the reflecting member 4 is fixed to the LED matrix board 3, and the LED matrix board 3 is coupled to and supported by the display apparatus body 6 by the support studs 5.

The support studs 5 are made of a material which has a good reflecting efficiency and a high thermal conductivity, such as copper or aluminum plated with chromium. Heat radiator plates 7 are attached to either the support studs 5 or the display apparatus body 6 for conducting heat transmitted to the support studs 5 for an increased heat radiating efficiency.

Emission of light from the LEDs 2 of the video display apparatus will be described below with reference to FIGS. 10A, 10B, and 11.

FIG. 10A shows at an enlarged scale an encircled portion indicated by the broken line B in FIG. 4B. Since the reflecting member 4 is mounted on the LED matrix board 3, a pair of opposite reflecting surfaces 4a positioned vertically one on each side of an LED 2 is progressively spread at the angle α with respect to the primary viewing direction which extends perpendicularly to the display panel of the video display apparatus, i.e., the general plane of the LED matrix board 3.

As shown in FIG. 10A, the surface-mounted LED 2 emit light with wide directivity. Rays of light which are emitted vertically, or upwardly and downwardly, from the surface-mounted LED 2 are reflected by the upper and lower reflecting surfaces 2a as indicated by the broken-line arrows, and directed substantially along the primary viewing direction. As a consequence, the light emitted from the surface-mounted LED 2 has relatively narrow directivity with respect to the vertical direction.

Figure 11:
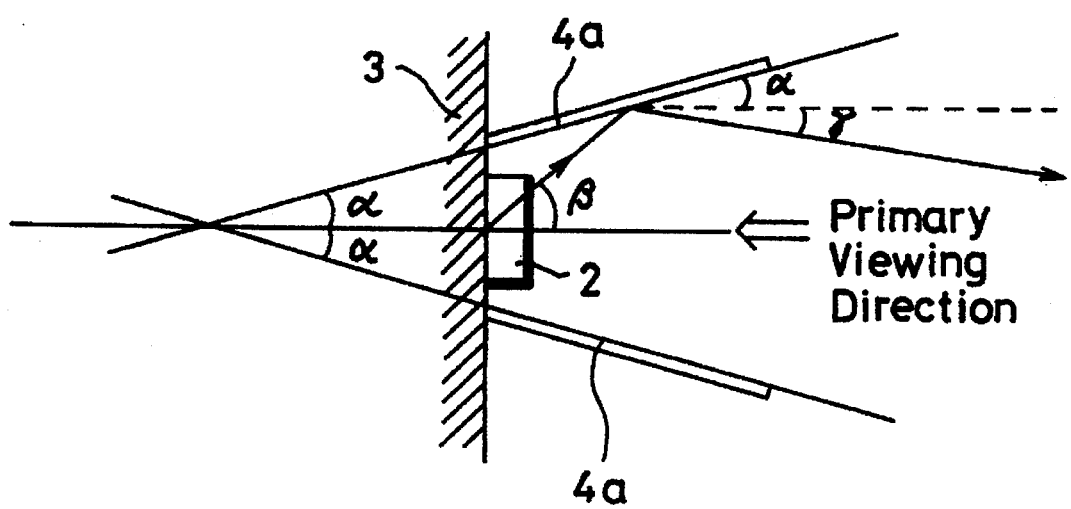
FIG. 11 is a view showing the relationship between an angle of inclination of the reflecting member, the angle at which light is emitted from an LED, and the angle at which the light is reflected by the reflecting member.

Specifically, as shown in FIG. 11, it is assumed that the reflecting surfaces 4a positioned above and below the LED 2 are inclined at the angle α with respect to the primary viewing direction, and the light is emitted from the LED 2 at an angle β with respect to the primary viewing direction. The angle γ at which the light is reflected by each of the reflecting surfaces 4a with respect to the primary viewing direction is then expressed by:

$$\gamma = \beta - 2\alpha$$

Therefore, the angle α of inclination of the reflecting surfaces 4a may be selected according to the above equation in order to reflect the emitted light based on the desired directivity. In this embodiment, the angle α may be selected to be about 10°.

No reflecting surfaces or blocking surfaces are positioned in the horizontal direction on both sides of each of the LEDs 2. Therefore, rays of light emitted horizontally from the LEDs 2 are spread horizontally as indicated by the broken-line arrows in FIG. 10B. Consequently, the light emitted from the LEDs 2 has wide directivity in the horizontal direction.

The horizontally continuous reflecting surfaces 4a give vertically narrow directivity to the light emitted from the surface-mounted LEDs 2 which have wide directivity on its own, and horizontally wide directivity to the light emitted from the surface-mounted LEDs 2. Therefore, the video display apparatus can provide a wide angle of view which is generally required in the horizontal direction, and a narrow angle of view in the vertical direction for preventing light from being scattered in the vertical direction to maintain a desired level of luminosity.

As shown in FIG. 6, the green LEDs 2(G), the red LED 2(R), and the blue LED 2(B) of the pixel $P_A$ are arranged successively in the horizontal direction. This successive arrangement of the different LEDs 2 is effective in reducing changes of luminosity ratios of the colors produced by the LEDs 2 depending on the vertical position from which the video display apparatus is viewed, thus eliminating the problem of hue variations depending on that position.

If the green LEDs 2(G), the red LED 2(R), and the blue LED 2(B) were arranged successively in the vertical direction, and vertically sandwiched between the adjacent reflecting surfaces 4a, then the proportions of rays of light emitted from these LEDs 2(G), (R), (B) and reflected by the reflecting surfaces 4a, and hence their luminosity ratio would be varied depending on the vertical position from which the video display apparatus is viewed. With the green LEDs 2(G), the red LED 2(R), and the blue LED 2(B) of the pixel $P_A$ arranged successively in the horizontal direction according to the illustrated embodiment, the proportions of rays of light emitted from these LEDs 2(G), (R), (B) and reflected by the reflecting surfaces 4a remain substantially unchanged irrespective of the vertical position from which the video display apparatus is viewed.

The light emitted from the surface-mounted LED 2 is spread horizontally as indicated by the broken-line arrows in FIG. 10B. Therefore, the luminosity ratio of rays of light emitted from the LEDs 2(G), (R), (B) remains substantially the same horizontally in any horizontal position from which the video display apparatus is viewed, regardless of the arrangement of the LEDs 2(G), (R), (B).

As shown in FIG. 8, the lower surface regions 4b and the upper surface regions 4c, which are shown hatched in FIGS. 7A, 8, and 9, i.e., those surface regions other than the reflecting surfaces 4a of the reflecting member 4, have respective black upper surfaces M for not reflecting light. Consequently, when the LED video display apparatus 1 is viewed from the front side in the primary viewing direction, the LEDs 2 are surrounded by black regions as shown hatched in FIG. 7A.

If the lower surface regions 4b and the upper surface regions 4c were finished into mirror surfaces rather than the black surfaces M, then these surface regions would unduly reflect external light, tending to lower the contrast of images displayed by the LED video display apparatus 1. The black upper surfaces M other than the LEDs 2 and the reflecting surfaces 4a are effective in minimizing unwanted reflections for increased image contrast.

Since the reflecting member 4 is made of a material of good thermal conductivity such as aluminum, as described above, the reflecting member 4 doubles as a heat radiator plate for dissipating the heat which is generated by the front surface of the LED matrix board 3 when the LEDs 2 are energized to emit light. The reflecting member 4 has a high heat radiating capability because it is bent into a succession of ridges which provide a relatively large surface area.

Inasmuch as the reflecting member 4 of aluminum is electrically conductive, it also is capable of blocking the radiation of a high-frequency energy which is produced by pulses applied to energize the LEDs 2.

While the reflecting member 4 may be made of a material other than aluminum, it should preferably be made of a material which is highly resistant to rust, light-weight, and highly machinable.

If the screws N shown in FIG. 4B are made of metal, then the reflecting member 4 is thermally connected to the support posts 5 on the back of the LED matrix board 3 for greater heat radiation.

The illustrated embodiment has been described as being directed to a color image video display apparatus which employs red, green, blue LEDs. However, the principles of the present invention are also applicable to any of various other video display apparatus employing LEDs for producing more than three colors or LEDs for emitting monochromatic light. The arrangement of LEDs 2 and the shape of the reflecting member 4 are not limited to those illustrated, but may be modified depending on the conditions in which the video display apparatus is used.

Although a certain preferred embodiment of the present invention has been shown and described in detail, it should be understood that various changes and modifications may be made therein without departing from the scope of the appended claims.

What is claimed is:

1. A video display apparatus comprising:

a matrix board;

a dot matrix of light-emitting elements mounted on said matrix board in a matrix of horizontal rows and vertical columns for displaying an image; and a unitary reflecting member in the form of a corrugated sheet mounted on said matrix board and having a plurality of pairs of slanted reflecting surfaces inclined with respect to said matrix board, the slanted reflecting surfaces of said pair being respectively disposed only above and below in a vertical direction each of said light-emitting elements in said horizontal rows on said matrix board.

2. A video display apparatus according to claim 1, wherein said slanted reflecting surfaces of each pair extend continuously horizontally along said horizontal rows and are integrally joined to each other at first ends thereof proximal said matrix board, and adjacent ones of the slanted reflecting surfaces of adjacent ones of the pairs are integrally joined to each other at second ends thereof distal said matrix board.

3. A video display apparatus according to claim 2, wherein said reflecting member has a plurality of openings defined therein between the slanted reflecting surfaces which are integrally joined to each other at the first ends thereof, and said reflecting member is mounted on said matrix board so that said light-emitting elements are respectively exposed through said openings.

4. A video display apparatus according to claim 2 or 3, wherein said reflecting surfaces are integrally joined at the first and second ends thereof by non-light-reflecting regions.

5. A video display apparatus according to claim 1, wherein said reflecting surfaces are made of a metallic material of thermal conductivity for dissipating heat from said light emitting elements.

6. A video display apparatus according to claim 1, wherein said light-emitting elements comprise light-emitting elements for emitting lights in different colors.

7. A video display apparatus according to claim 1, wherein said light-emitting elements comprise light-emitting diodes.

* * * * *